United States Patent
Kanemori

(10) Patent No.: US 11,634,570 B2
(45) Date of Patent: Apr. 25, 2023

(54) THERMOPLASTIC ELASTOMER COMPOSITION

(71) Applicant: Sumitomo Chemical Company, Limited, Tokyo (JP)

(72) Inventor: Tomoki Kanemori, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 217 days.

(21) Appl. No.: 17/204,032

(22) Filed: Mar. 17, 2021

(65) Prior Publication Data

US 2021/0292529 A1 Sep. 23, 2021

(30) Foreign Application Priority Data

Mar. 23, 2020 (JP) .............................. JP2020-051809

(51) Int. Cl.
| | | |
|---|---|---|
| *C08L 23/14* | (2006.01) | |
| *C08L 23/06* | (2006.01) | |
| *C08L 23/08* | (2006.01) | |
| *C08L 53/02* | (2006.01) | |

(52) U.S. Cl.
CPC ............ *C08L 23/142* (2013.01); *C08L 23/06* (2013.01); *C08L 23/0823* (2013.01); *C08L 53/02* (2013.01); *C08L 2205/025* (2013.01); *C08L 2205/035* (2013.01)

(58) Field of Classification Search
CPC ........ C08L 23/14; C08L 23/142; C08L 23/12; C08L 23/06; C08L 2205/025; C08L 23/0815; C08L 23/16
See application file for complete search history.

(56) References Cited

U.S. PATENT DOCUMENTS

| | | | |
|---|---|---|---|
| 2001/0028932 A1 | 10/2001 | Akaike et al. | |
| 2002/0119268 A1 | 8/2002 | Gakuji et al. | |
| 2010/0000524 A1* | 1/2010 | Ohbi ................ C09K 3/10 | |
| | | | 524/451 |
| 2015/0191590 A1 | 7/2015 | Mikami et al. | |
| 2016/0244599 A1* | 8/2016 | Kurokawa ............. C08L 23/12 |
| 2018/0312616 A1 | 11/2018 | Kida | |

FOREIGN PATENT DOCUMENTS

| | | |
|---|---|---|
| EP | 3059280 A1 | 8/2016 |
| JP | H10265628 A | 10/1998 |
| JP | 200072937 A | 3/2000 |
| JP | 2000159944 A | 6/2000 |
| JP | 2001279030 A | 10/2001 |
| JP | 2002194098 A | 7/2002 |
| JP | 6213090 B2 | 10/2017 |
| JP | 2018188631 A | 11/2018 |

OTHER PUBLICATIONS

Extended European Search Report dated Jan. 14, 2022 in EP Application No. 21160623.1.

* cited by examiner

*Primary Examiner* — Jeffrey C Mullis

(74) *Attorney, Agent, or Firm* — Panitch Schwarze Belisario & Nadel LLP

(57) ABSTRACT

A thermoplastic elastomer composition that can form a molded article having both high low-temperature impact resistance and high high-temperature impact resistance is provided. A specimen of the thermoplastic elastomer composition 30 mm wide×30 mm long×2.0 mm thick punched out from a central portion of a molded article formed by injection-molding the thermoplastic elastomer composition into a mold cavity 90 mm wide×150 mm long×2.0 mm thick at a cylinder temperature of 220° C., a mold temperature of 50° C., and an injection rate of 25 $cm^3$/sec satisfies the following requirements: (1) an area increase rate S of the specimen after impregnation with petroleum benzine at 23° C. for 24 hours is 20% or less; and (2): a volume increase rate V of the specimen after impregnation with petroleum benzine at 23° C. for 24 hours is 20% or more and 125% or less.

11 Claims, No Drawings

THERMOPLASTIC ELASTOMER COMPOSITION

CROSS-REFERENCE TO RELATED APPLICATION

This application claims priority under 35 U.S.C. § 119(b) to Japanese Application No. 2020-051809, filed Mar. 23, 2020, the disclosure of which is incorporated herein by reference in its entirety.

BACKGROUND OF THE INVENTION

Field of the Invention

The present disclosure relates to a thermoplastic elastomer composition.

Description of the Related Art

Thermoplastic elastomer compositions comprising an ethylene-based polymer component and a propylene-based polymer component are used as materials of airbag covers (e.g., see JP-A-10-265628, JP-A-2000-72937, JP-A-2001-279030, and JP-A-2002-194098).

SUMMARY OF THE INVENTION

One of characteristics strongly required for airbag covers is impact resistance. Since airbag covers may be used at high temperature or low temperature in cars, airbag covers preferably have high impact resistance at both high temperature and low temperature.

Under such a circumstance, an object of the present disclosure is to provide a thermoplastic elastomer composition that can form a molded article having both high low-temperature impact resistance and high high-temperature impact resistance.

The inventors of the present disclosure have completed the present disclosure as a result of intensive studies in light of such a background.

Specifically, the present disclosure is directed to

[1]

a thermoplastic elastomer composition, wherein a specimen having a size of 30 mm wide×30 mm long×2.0 mm thick punched out from a central portion of a molded article formed by injection-molding the thermoplastic elastomer composition into a mold cavity, 90 mm wide×150 mm long×2.0 mm thick, under conditions of a cylinder temperature of 220° C., a mold temperature of 50° C., and an injection rate of 25 cm³/sec satisfies the following requirements (1) and (2).

Requirement (1): an area increase rate S of the specimen after impregnation with petroleum benzine at 23° C. for 24 hours is 20% or less, and Requirement (2): a volume increase rate V of the specimen after impregnation with petroleum benzine at 23° C. for 24 hours is 20% or more and 125% or less.

The following [2] to [9] are preferred aspects or embodiments of the present disclosure.

[2]

The thermoplastic elastomer composition described in [1], wherein the thermoplastic elastomer composition comprises an ethylene-based polymer component (A) and a propylene-based polymer component (B).

[3]

The thermoplastic elastomer composition described in [2], wherein the ethylene-based polymer component (A) comprises at least one ethylene-based polymer selected from the group consisting of the following component (A1), the following component (A2) and the following component (A3), and the ethylene-based polymer component (A) has an enthalpy of fusion $\Delta H_{mA}$ of 1 J/g or more and 115 J/g or less in a temperature range of 70° C. or more and 140° C. or less as measured by differential scanning calorimetry, Component (A1): an amorphous ethylene-based polymer;

Component (A2): a crystalline ethylene-based polymer comprising 90 wt % or more of a structural unit derived from ethylene; and Component (A3): a crystalline ethylene-based copolymer comprising 50 wt % or more and less than 90 wt % of a structural unit derived from ethylene.

[4]

The thermoplastic elastomer composition described in any one of [1] to [3], wherein the thermoplastic elastomer composition has an enthalpy of fusion $\Delta H_{m1}$ of 115 J/g or less in a temperature range of 70° C. or more and 200° C. or less as measured by differential scanning calorimetry.

[5]

The thermoplastic elastomer composition described in any one of [1] to [4], wherein the thermoplastic elastomer composition has an enthalpy of fusion $\Delta H_{m2}$ of 1 J/g or more in a temperature range of 70° C. or more and 140° C. or less as measured by differential scanning calorimetry.

[6]

The thermoplastic elastomer composition described in any one of [2] to [5], wherein the component (B) comprises a propylene-based polymer (B2) whose insoluble portion has an intrinsic viscosity ($[\eta_{cxis}]$) of 1.5 dl/g or more and 7.5 dl/g or less.

[7]

The thermoplastic elastomer composition described in [6], wherein the insoluble portion of the propylene-based polymer (B2) has an intrinsic viscosity ($[\eta_{cxis}]$) of 1.5 dl/g or more and 6.0 dl/g or less.

[8]

The thermoplastic elastomer composition described in any one of [1] to [7], wherein the thermoplastic elastomer composition satisfies the following requirement (1'), Requirement (1'): the area increase rate S of the specimen after impregnation with petroleum benzine at 23° C. for 24 hours is 4% or more and 15% or less.

[9]

The thermoplastic elastomer composition described in any one of [1] to [8], wherein the thermoplastic elastomer composition satisfies the following requirement (2'), Requirement (2'): the volume increase rate V of the specimen after impregnation with petroleum benzine at 23° C. for 24 hours is 55% or more and 115% or less.

[10]

A molded article comprising the thermoplastic elastomer composition described in any one of [1] to [9].

[11]

An airbag cover comprising the thermoplastic elastomer composition described in any one of [1] to [9].

The present disclosure can provide a thermoplastic elastomer composition that can form a molded article having both high low-temperature impact resistance and high high-temperature impact resistance and that can be suitably used in various applications, such as airbag covers.

DETAILED DESCRIPTION OF THE PREFERRED EMBODIMENTS

The thermoplastic elastomer composition according to the present disclosure provides a molded article in such a manner that the thermoplastic elastomer composition is injection-molded into a mold cavity, 90 mm wide×150 mm long×2.0 mm thick, under the conditions of a cylinder temperature of 220° C., a mold temperature of 50° C., and an injection rate of 25 cm$^3$/sec. In this process, sufficient holding pressure is applied so as not to cause sink marks in order to produce a molded article with a filling rate sufficient for appropriate measurement. A specimen having a size of 30 mm wide×30 mm long×2.0 mm thick punched out from a central portion of the molded article satisfies the following requirements (1) and (2).

Requirement (1): an area increase rate S of the specimen after impregnation with petroleum benzine at 23° C. for 24 hours is 20% or less, and Requirement (2): a volume increase rate V of the specimen after impregnation with petroleum benzine at 23° C. for 24 hours is 20% or more and 125% or less.

The thermoplastic elastomer composition used for injection molding may be in any form as long as it can be injection-molded. The thermoplastic elastomer composition used for injection molding may be in various forms, such as pellets and molded article ground materials.

Area Increase Rate S

The area increase rate S is calculated according to the following formula from the area $S_{24}$ calculated from the length and thickness of the specimen measured after the specimen is impregnate with petroleum benzine at 23° C. for 24 hours in accordance with JIS K 6258.

Area increase rate $S$: $(S_{24}/S_0-1)\times100[\%]$ $S_0$: area (width×length) before impregnation with petroleum benzine, $S_{24}$: area (width×length) after impregnation with petroleum benzine As described above, the area increase rate S defined above in the present disclosure is 20% or less. When the area increase rate S is 20% or less and when other conditions defined in the present disclosure are satisfied, a molded article having both high low-temperature impact resistance and high high-temperature impact resistance can be produced by using the thermoplastic elastomer composition according to the present disclosure.

The area increase rate S is normally 0, or more, preferably 4% or more and 20% or less, more preferably 4% or more and 15% or less, still more preferably 5% or more and 10% or less.

The area increase rate S can be appropriately adjusted by controlling, for example, the amounts and molecular weights and density of the component (A2) and the component (A3), the amount of a structural unit derived from ethylene in the component (A2) and the component (A3), and the amount and molecular weight of the component (B2), and the amount of a structural unit derived from propylene in the component (B2). As the amounts of the component (A2) and the component (B2) increase, the area increase rate S tends to decrease. The area increase rate S can be appropriately adjusted according to the conditions of melt-kneading, particularly the presence of dynamic crosslinking or the like.

Volume Increase Rate V

The volume increase rate V is calculated according to the following formula from the volume $V_{24}$ calculated from the width, length, and thickness of the specimen measured after the specimen is impregnate with petroleum benzine at 23° C. for 24 hours in accordance with JIS K 6258.

Volume increase rate $V$: $(V_{24}/V_0-1)\times100[\%]$ $V_0$: volume (width×length×thickness) before impregnation with petroleum benzine, $V_{24}$: volume (width×length×thickness) after impregnation with petroleum benzine As described above, the volume increase rate V defined above in the present disclosure is 20% or more and 125% or less. When the volume increase rate V satisfies this condition and when other conditions defined in the present disclosure are satisfied, a molded article having both high low-temperature impact resistance and high high-temperature impact resistance can be produced by using the thermoplastic elastomer composition according to the present disclosure.

The volume increase rate V is preferably 55% or more and 120% or less, more preferably 55% or more and 115% or less, still more preferably 80% or more and 115% or less.

The volume increase rate V can be appropriately adjusted by controlling, for example, the amounts of the component (A1), the component (A2), and the component (A3), and the amount and density of the structural unit derived from ethylene in the component (A1), the component (A2), and the component (A3). The volume increase rate V can also be appropriately adjusted by controlling, for example, the amounts of the component (B1) and the component (B2), and the amount of a structural unit derived from propylene in the component (B1) and the component (B2). The volume increase rate V can also be appropriately adjusted by, for example, addition of a nucleating agent.

Enthalpy of Fusion ΔH

The enthalpy of fusion OH of the thermoplastic elastomer composition according to the present disclosure in a particular temperature range as measured by differential scanning calorimetry is preferably in a particular range of values.

The enthalpy of fusion ΔH refers to the heat of fusion determined by analyzing, in accordance with the method specified in JIS K 7122-1987, part of a melting curve in a predetermined temperature range as measured by differential scanning calorimetry according to the following method.

Method for Measuring Melting Curve by Differential Scanning Calorimetry

In a nitrogen atmosphere in a differential scanning calorimeter, an aluminum pan comprising about 5 mg of a sample is (1) maintained at 220° C. for 5 minutes, next (2) cooled from 220° C. to −80° C. at a rate of 10° C./min, next (3) maintained at −80° C. for 10 minutes, and next (4) heated from −80° C. to 220° C. at a rate of 10° C./min. The differential scanning calorimetry curve obtained by calorimetry in the process (4) is defined as a melting curve.

More specifically, the thermoplastic elastomer composition according to the present disclosure preferably has an enthalpy of fusion $\Delta H_{m1}$ of 115 J/g or less in a temperature range of 70° C. or more and 200° C. or less as measured by differential scanning calorimetry.

From the viewpoint of, for example, low-temperature impact resistance and stiffness, it is preferred that the enthalpy of fusion $\Delta H_{m1}$ in a temperature range of 70° C. or more and 200° C. or less as measured by differential scanning calorimetry be in the above range.

More specifically, the enthalpy of fusion $\Delta H_{m1}$ of the thermoplastic elastomer composition according to the present disclosure in a temperature range of 70° C. or more and 200° C. or less as measured by differential scanning calorimetry is more preferably 35 J/g or more and 95 J/g or less, still more preferably 65 J/g or more and 85 J/g or less.

The enthalpy of fusion $\Delta H_{m1}$ can be appropriately adjusted by controlling, for example, the amounts of the component (A1), the component (A2), and the component (A3), and the amount and density of the structural unit derived from ethylene in the component (A1), the component (A2), and the component (A3).

The enthalpy of fusion $\Delta H_{m1}$ can also be appropriately adjusted by controlling, for example, the amounts of the component (B1) and the component (B2), and the amount of the structural unit derived from propylene in the component (B1) and the component (B2). The enthalpy of fusion $\Delta H_{m1}$ can also be appropriately adjusted by, for example, addition of a nucleating agent.

The thermoplastic elastomer composition according to the present disclosure preferably has an enthalpy of fusion $\Delta H_{m1}$ of 1 J/g or more in a temperature range of 70° C. or more and 140° C. or less as measured by differential scanning calorimetry.

From the viewpoint of, for example, high-temperature impact resistance and moldability, it is preferred that the enthalpy of fusion $\Delta H_{m2}$ in a temperature range of 70° C. or more and 140° C. or less as measured by differential scanning calorimetry be in the above range.

The enthalpy of fusion $\Delta H_{m2}$ of the thermoplastic elastomer composition according to the present disclosure in a temperature range of 70° C. or more and 140° C. or less as measured by differential scanning calorimetry is more preferably 6 J/g or more, still more preferably 10 J/g or more and 25 J/g or less.

The enthalpy of fusion $\Delta H_{m2}$ can also be appropriately adjusted by controlling, for example, the amounts of the component (A2) and the component (A3), and the amount and density of the structural unit derived from ethylene in the component (A2) and the component (A3). In general, the enthalpy of fusion $\Delta H_{m2}$ tends to increase as the amount of crystalline ethylene-based polymers increases. The enthalpy of fusion $\Delta H_{m2}$ can also be appropriately adjusted by, for example, addition of a nucleating agent.

Impact Resistance

When the thermoplastic elastomer composition according to the present disclosure satisfies the requirements (1) and (2) described above, a molded article having high impact resistance, particularly a molded article having both high low-temperature impact resistance and high high-temperature impact resistance, can be produced.

For example, the thermoplastic elastomer composition according to the present disclosure is preferably such that a molded article (an injection-molded article before punching out a specimen used for measuring the requirements (1) and (2)) formed by injection-molding the thermoplastic elastomer composition into a mold cavity, 90 mm wide×150 mm long×2.0 mm thick, under the conditions of a cylinder temperature of 220° C., a mold temperature of 50° C., and an injection rate of 25 cm$^3$/sec shows a high IZOD impact strength.

More specifically, the IZOD impact strength of the injection-molded article at −40° C. is preferably 10.0 kJ/m$^2$ or more, more preferably 20.0 kJ/m$^2$ or more, still more preferably 50.0 kJ/m$^2$.

The IZOD impact strength at −40° C. can be measured by a method commonly used in the related art and can be measured, for example, in accordance with JIS K 7110.

The type of break of an injection-molded article in the IZOD impact strength test is preferably a hinge break—an incomplete break such that both specimen parts are held together by only a thin surface layer in the form of a hinge having no bending stiffness, or a partial break—an incomplete break that does not meet the definition of hinge break.

Furthermore, the IZOD impact strength of the injection-molded article at 85° C. is preferably 37.0 kJ/m$^2$ or more, more preferably 40.0 kJ/m$^2$ or more.

The IZOD impact strength at 85° C. can also be measured by a method commonly used in the related art and can be measured, for example, in accordance with JIS K 7110.

The type of break of an injection-molded article in the IZOD impact strength test is preferably a partial break—an incomplete break that does not meet the definition of the hinge break.

The thermoplastic elastomer composition according to the present disclosure is such that any specimen prepared from the thermoplastic elastomer composition under the above conditions satisfies the requirements (1) and (2). The thermoplastic elastomer composition preferably, but not necessarily, comprises the following ethylene-based polymer component (A) and the following propylene-based polymer component (B).

The ethylene-based polymer component (A) is a component comprising a polymer including 50 wt % or more of a structural unit derived from ethylene. The propylene-based polymer component (B) is a component comprising a polymer including more than 50 wt % and 100 wt or less of a structural unit derived from propylene.

The thermoplastic elastomer composition according to this embodiment may be composed of the ethylene-based polymer component (A) and the propylene-based polymer component (B) or may comprise other components in addition to the ethylene-based polymer component (A) and the propylene-based polymer component (B).

The amounts of the ethylene-based polymer component (A) and the propylene-based polymer component (B) are not limited, but the thermoplastic elastomer composition according to this embodiment preferably comprises 20 wt % or more and 80 wt % or less of the ethylene-based polymer component (A) and 20 wt % or more and 80 wt % or less of the propylene-based polymer component (B) relative to 100 wt % of the total weight of the thermoplastic elastomer composition according to this embodiment.

The amount of the ethylene-based polymer component (A) is preferably 25 wt % or more and 75 wt % or less, more preferably 30 wt % or more and 70 wt % or less, still more preferably 35 wt % or more and 65 wt % or less.

The amount of the propylene-based polymer component (B) is preferably 25 wt % or more and 75 wt % or less, more preferably 30 wt % or more and 70 wt % or less, still more preferably 35 wt % or more and 65 wt % or less.

Ethylene-Based Polymer Component (A)

The ethylene-based polymer component (A) in the thermoplastic elastomer composition according to this embodiment is a component comprising a polymer including 50 wt % or more of a structural unit derived from ethylene.

The ethylene-based polymer component (A) may comprise one polymer including 50 wt % or more of a structural unit derived from ethylene, or may comprise a combination of two or more polymers including 50 wt % or more of a structural unit derived from ethylene.

An ethylene-based polymer in the ethylene-based polymer component (A) is any polymer including 50 wt % or more of a structural unit derived from ethylene. The ethylene-based polymer is preferably at least one ethylene-based polymer selected from the group consisting of the component (A1), the component (A2), and the component (A3).

The ethylene-based polymer component (A) according to this embodiment may be composed of the component (A2)

and the component (A3), or may comprise other components in addition to the component (A1), the component (A2) and the component (A3).

The amounts of the component (A1), the component (A2) and the component (A3) are not limited, but the ethylene-based polymer component (A) according to this embodiment preferably comprises 0 wt % or more and 99 wt % or less of the component (A1), 0 wt % or more and 45 wt % or less of the component (A2), and 0 wt or more and 100 wt % or less of the component (A3) relative to 100 wt % of the total weight of the ethylene-based polymer component (A) according to this embodiment.

The amount of the component (A1) is more preferably 5 wt % or more and 85 wt % or less.

The amount of the component (A2) is more preferably 0 wt % or more and 20 wt % or less, still more preferably 5 wt % or more and 20 wt % or less.

The amount of the component (A3) is more preferably 0 wt % or more and 95 wt % or less, still more preferably 0 wt % or more and 90 wt % or less.

In the thermoplastic elastomer composition according to this embodiment comprising the ethylene-based polymer component (A), the ethylene-based polymer component (A) preferably has an enthalpy of fusion $\Delta H_{mA}$ of 1 J/g or more and 115 J/g or less in a temperature range of 70° C. or more and 140° C. or less as measured by differential scanning calorimetry.

It is preferred that the ethylene-based polymer component (A) have an enthalpy of fusion $\Delta H_{mA}$ of 1 J/g or more from the viewpoint of, for example, high-temperature impact resistance. An enthalpy of fusion $\Delta H_{mA}$ of less than 1 J/g may result in poor releasability from a mold during molding.

The enthalpy of fusion $\Delta H_{mA}$ of the thermoplastic elastomer composition according to the present disclosure in a temperature range of 70° C. or more and 140° C. or less as measured by differential scanning calorimetry is more preferably 20 J/g or more, still more preferably 27 J/g or more and 90 J/g or less, yet still more preferably 35 J/g or more and 60 J/g or less.

The method for calculating the enthalpy of fusion $\Delta H_{mA}$ of the ethylene-based polymer component (A) is the same as that described above for the enthalpy of fusion $\Delta H$ of the thermoplastic elastomer composition according to the present disclosure.

The enthalpy of fusion $\Delta H_{mA}$ can be appropriately adjusted by adjusting the types and amounts of the component (A1), the component (A2) and the component (A3). In general, the enthalpy of fusion $\Delta H_{mA}$ tends to decrease as the amount of crystalline components decreases.

When the ethylene-based polymer component (A) comprises multiple components, the enthalpy of fusion $\Delta H_{mA}$ of the ethylene-based polymer component (A) is an arithmetic mean in consideration of the enthalpies of fusion and weights of those multiple components.

For example, when the ethylene-based polymer component (A) comprises the component (A1), the component (A2) and the component (A3), the enthalpy of fusion $\Delta H_{mA}$ of the ethylene-based polymer component (A) can be calculated according to the following formula from the enthalpies of fusion $\Delta H_{mA1}$, $\Delta H_{mA2}$, and $\Delta H_{mA3}$ and weights $W_{A1}$, $W_{A2}$, and $W_{A3}$ of the components.

$$(\Delta H_{mA1}W_{A1}+\Delta H_{mA2}W_{A2}+\Delta H_{mA3}W_{A3})/(W_{A1}+W_{A2}+W_{A3})$$

An ethylene-based polymer in the ethylene-based polymer component (A) is any polymer including 50 wt % or more of a structural unit derived from ethylene. The ethylene-based polymer is preferably at least one ethylene-based polymer selected from the group consisting of the component (A1), the component (A2), and the component (A3).

Amorphous Ethylene-Based Polymer (A1)

An amorphous ethylene-based polymer (A1), which is preferably used as all or part of the ethylene-based polymer component (A), is any ethylene-based polymer including 50 wt % or more of a structural unit derived from ethylene and being amorphous at ordinary temperature. The amorphous ethylene-based polymer (A1) is preferably, but not necessarily, an amorphous ethylene-α-olefin copolymer (A1-1) and/or an ethylene-α-olefin-non-conjugated diene copolymer (A1-2), which are described below in detail. The amorphous ethylene-based polymer (A1) has an enthalpy of fusion of less than 10 J/g in a temperature range of 70° C. or more and 140° C. or less as measured by differential scanning calorimetry.

Amorphous Ethylene-α-Olefin Copolymer (A1-1)

The amorphous ethylene-α-olefin copolymer (A1-1), which is preferably used as the amorphous ethylene-based polymer (A1), is an amorphous ethylene copolymer including a structural unit derived from ethylene and a structural unit derived from at least one selected from the group consisting of propylene and α-olefins having 4 or more carbon atoms. Preferably, the amorphous ethylene-α-olefin copolymer (A1-1) includes 50 wt or more and less than 90 wt % or less of a structural unit derived from ethylene and 5 wt % or more and 50 wt % or less of a structural unit derived from at least one selected from the group consisting of propylene and α-olefins having 4 or more carbon atoms (provided that the total weight of the amorphous ethylene-α-olefin copolymer (A1-1) is 100 wt %) and has a Mooney viscosity ($ML_{1+4}$, 125° C.) of 15 or more and 40 or less and a density of 0.850 g/cm$^3$ or more and 0.890 g/cm$^3$ or less. The amorphous ethylene-α-olefin copolymer (A1-1) may include two or more structural units derived from α-olefins having 4 or more carbon atoms.

The α-olefin having 4 or more carbon atoms in the amorphous ethylene-α-olefin copolymer (A1-1) is preferably an α-olefin having 4 to 8 carbon atoms, such as 1-butene, 2-methylpropylene, 1-pentene, 3-methyl-1-butene, 1-hexene, 4-methyl-1-pentene, or 1-octene. The α-olefin having 4 to 8 carbon atoms is preferably 1-butene, 1-hexene, or 1-octene.

In the amorphous ethylene-α-olefin copolymer (A1-1), the amount of the structural unit derived from ethylene is preferably 50 wt % or more and less than 90 wt %, more preferably 52 wt % or more and 65 wt % or less, and the amount of the structural unit derived from at least one selected from the group consisting of propylene and α-olefins having 4 or more carbon atoms is preferably 10 wt % or more and 50 wt % or less, more preferably 35 wt % or more and 48 wt % or less (provided that the total weight of the amorphous ethylene-α-olefin copolymer (A1-1) is 100 wt).

The amount of the structural unit derived from ethylene and the amount of the structural unit derived from at least one selected from the group consisting of propylene and α-olefins having 4 or more carbon atoms in the amorphous ethylene-α-olefin copolymer (A1-1) can be determined by nuclear magnetic resonance (NMR).

The density of the amorphous ethylene-α-olefin copolymer (A1-1) is preferably 0.850 g/cm$^3$ or more and 0.890 g/cm$^3$ or less and, from the viewpoint of the low-temperature impact resistance of molded articles and the dimensional stability in molding into molded articles, more preferably 0.850 g/cm$^3$ or more and 0.875 g/cm$^3$ or less.

The Mooney viscosity ($ML_{1+4}$, 125° C.) of the amorphous ethylene-α-olefin copolymer (A1-1) measured at 125° C. is preferably 20 or more and 30 or less from the viewpoint of low-temperature impact resistance.

Examples of the method for producing the amorphous ethylene-α-olefin copolymer (A1-1) include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

Ethylene-α-Olefin-Non-Conjugated Diene Copolymer (A1-2)

The ethylene-α-olefin-non-conjugated diene copolymer (A1-2), which is preferably used as the amorphous ethylene-based polymer (A1), is a non-conjugated diene copolymer including a structural unit derived from ethylene, a structural unit derived from at least one selected from the group consisting of propylene and α-olefins having 4 or more carbon atoms, and a structural unit derived from a non-conjugated diene, wherein the amount of the structural unit derived from ethylene is 50 wt % or more. Preferably, the ethylene-α-olefin-non-conjugated diene copolymer (A1-2) includes 35 wt % or more and 50 wt % or less of the structural unit derived from at least one selected from the group consisting of propylene and α-olefins having 4 or more carbon atoms (provided that the total amount of the structural unit derived from ethylene and the structural unit derived from at least one selected from the group consisting of propylene and α-olefins having 4 or more carbon atoms is 100 wt %) and has an iodine value of 0.1 or more and 20 or less, a Mooney viscosity ($ML_{1+4}$, 125° C.) of 40 or more and 85 or less, and a molecular weight distribution (Mw/Mn) of 1.5 or more and 3.5 or less.

Examples of the method for producing the ethylene-α-olefin-non-conjugated diene copolymer (A1-2) include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

To regulate the molecular weight of the ethylene-α-olefin-non-conjugated diene copolymer (A1-2) to be produced, a molecular weight regulator, such as hydrogen, may be used.

The α-olefin having 4 or more carbon atoms in the non-conjugated diene copolymer of the ethylene-α-olefin-non-conjugated diene copolymer (A1-2) is preferably an α-olefin having 4 to 8 carbon atoms, such as 1-butene, 2-methylpropylene, 1-pentene, 3-methyl-1-butene, 1-hexene, 4-methyl-1-pentene, or 1-octene. The α-olefin having 4 to 8 carbon atoms is preferably 1-butene, 1-hexene, or 1-octene. These α-olefins having 4 or more carbon atoms may be used singly or in combination of two or more.

Examples of non-conjugated dienes for forming the structural unit derived from a non-conjugated diene include chain non-conjugated dienes, such as 1,4-hexadiene, 1,6-octadiene, 2-methyl-1,5-hexadiene, 6-methyl-1,5-heptadiene, and 7-methyl-1,6-octadiene; cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; and trienes, such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene. Preferred is 5-ethylidene-2-norbornene, 5-vinylnorbornene, or dicyclopentadiene.

The amount of the structural unit derived from ethylene in the ethylene-α-olefin-non-conjugated diene copolymer (A1-2) is preferably 50 wt % or more and 75 wt % or less and, from the viewpoint of the low-temperature impact resistance of molded articles, more preferably 50 wt % or more and 65 wt % or less. The amount of the structural unit derived from propylene in the component (A1-2) is preferably 25 wt % or more and 50 wt % or less and, from the viewpoint of the low-temperature impact resistance of molded articles, more preferably 35 wt % or more and 50 wt % or less (provided that the total amount of the structural unit derived from ethylene and the structural unit derived from propylene is 100 wt %).

The amount of the structural unit derived from ethylene and the amount of the structural unit derived from at least one selected from the group consisting of propylene and α-olefins having 4 or more carbon atoms in the ethylene-α-olefin-non-conjugated diene copolymer (A1-2) can be determined by nuclear magnetic resonance (NMR).

The Mooney viscosity ($ML_{1+4}$, 125° C.) of the ethylene-α-olefin-non-conjugated diene copolymer (A1-2) measured at 125° C. is preferably 40 or more and 85 or less, more preferably 43 or more and 75 or less, still more preferably 45 or more and 70 or less. The Mooney viscosity is measured in accordance with ASTM D-1646.

The iodine value of the ethylene-α-olefin-non-conjugated diene copolymer (A1-2) is preferably 0.1 or more and 20 or less and, from the viewpoint of the stiffness of molded articles, more preferably 0.1 or more and 15 or less, still more preferably 0.1 or more and 10 or less. The iodine value refers to the number of grams of iodine used in the reaction between 100 g of a sample and iodine.

The iodine value of the non-conjugated diene copolymer can be determined by infrared spectroscopy.

The molecular weight distribution of the ethylene-α-olefin-non-conjugated diene copolymer (A1-2) is preferably 1.5 or more and 3.5 or less and, from the viewpoint of the low-temperature impact resistance of molded articles, more preferably 1.5 or more and 3.0 or less, still more preferably 1.5 or more and 2.3 or less.

The molecular weight distribution refers to the ratio of the weight-average molecular weight (Mw) to the number-average molecular weight (Mn), that is, Mw/Mn, measured by gel permeation chromatography.

Component (A2): Crystalline Ethylene-Based Polymer Including 90 wt % or More of Structural Unit Derived from Ethylene The crystalline ethylene-based polymer (A2), which is preferably used as all or part of the ethylene-based polymer component (A), is a crystalline (co)polymer including 90 to 100 wt of a structural unit (ethylene unit) derived from ethylene. It is noted that the total weight of the crystalline ethylene-based polymer (A2) is 100 wt %. Examples of the crystalline ethylene-based polymer (A2) include an ethylene homopolymer, a copolymer of ethylene and at least one of α-olefins having 3 to 10 carbon atoms (e.g., propylene, 1-butene, 1-pentene, 4-methyl-1-pentene, and 1-hexene), and a copolymer of ethylene and at least one of polar monomers (e.g., vinyl acetate, acrylic acid esters, and methacrylic acid esters). Suitable examples of the crystalline ethylene-based polymer (A2) include high-density polyethylene, low-density polyethylene, ethylene-propylene copolymer, ethylene-1-butene copolymer, ethylene-1-pentene copolymer, ethylene-4-methyl-1-pentene copolymer, and ethylene-1-hexene copolymer. The crystalline ethylene-based polymer (A2) normally has an enthalpy of fusion of 50 J/g or more, preferably 100 J/g or more, more preferably 200 J/g or more, in a temperature range of 70° C. or more and 140° C. or less as measured by differential scanning calorimetry. The crystalline ethylene-based polymer (A2) normally has an enthalpy of fusion of 300 J/g or less in a temperature range of 70° C. or more and 140° C. or less.

The melt flow rate (measured at a temperature of 190° C. under a load of 21.18 N in accordance with JIS K 6760) of the crystalline ethylene-based polymer (A2) is preferably 0.01 to 300 g/10 min, more preferably 0.1 to 200 g/10 min.

When high-density polyethylene is used as the crystalline ethylene-based polymer (A2), the high-density polyethylene is preferably a polymer including 90 to 100 wt % of an ethylene-based structural unit (ethylene unit) and having a density of 0.940 g/cm$^3$ or more as measured in accordance with JIS K 7112. It is noted that the total weight of the high-density polyethylene is 100 wt %.

The amount of the structural unit derived from ethylene and the amount of the structural unit derived from at least one selected from the group consisting of propylene and α-olefins having 4 or more carbon atoms in the crystalline ethylene-based polymer (A2) can be determined by nuclear magnetic resonance (NMR).

The melt flow rate (measured at a temperature of 190° C. under a load of 21.18 N in accordance with JIS K 6760) of the high-density polyethylene is preferably 0.01 to 300 g/10 min, more preferably 0.1 to 200 g/10 min, still more preferably 0.5 to 50 g/10 min, yet still more preferably 1 to 20 g/10 min.

The high-density polyethylene can be produced by a known polymerization method using, for example, a Ziegler-Natta catalyst or a metallocene catalyst as a polymerization catalyst. Examples of the polymerization method include solution polymerization, bulk polymerization, slurry polymerization, and gas-phase polymerization. These methods may be used in combination of two or more.

Component (A3): Crystalline Ethylene-Based Copolymer Including 50 wt % or More and Less Than 90 wt % of Structural Unit Derived from Ethylene The component (A3), which is preferably used as all or part of the component (A), is a crystalline ethylene-based copolymer including 50 wt % or more and less than 90 wt % of a structural unit derived from ethylene.

The component (A3) is an olefin-based block copolymer including an ethylene polymer block and an ethylene-α-olefin copolymer block. The component (A3) preferably has a crystal fusion peak at 70° C. to 140° C. and preferably has an enthalpy of fusion of 10 to 70 J/g and more preferably has an enthalpy of fusion of 30 to 50 J/g.

The ethylene polymer block in the component (A3) mainly includes an ethylene unit and may have a structural unit derived from other monomer in addition to the ethylene unit. Examples of the structural unit derived from other monomer include structural units derived from 1-propylene, 1-butene, 2-methylpropylene, 1-pentene, 3-methyl-1-butene, 1-hexene, 4-methyl-1-pentene, and 1-octene. Suitable examples include structural units derived from α-olefins having 3 to 8 carbon atoms, such as 1-propylene, 1-butene, 1-hexene, and 1-octene, where a carbon-carbon double bond is present between terminal carbon atoms. The component (A3) may be a copolymer of one α-olefin and ethylene or may be a copolymer of two or more α-olefins and ethylene.

Examples of the ethylene-α-olefin copolymer block in the component (A3) include an ethylene-α-olefin copolymer block having, as structural units, an ethylene unit and an α-olefin unit, such as a 1-propylene, 1-butene, 2-methylpropylene, 1-pentene, 3-methyl-1-butene, 1-hexene, 4-methyl-1-pentene, or 1-octene unit. The α-olefin unit is preferably derived from an α-olefin having 4 to 8 carbon atoms, such as 1-propylene, 1-butene, 1-hexene, and 1-octene, where a carbon-carbon double bond is present between terminal carbon atoms. The component (A3) may be a copolymer of one α-olefin and ethylene or may be a copolymer of two or more α-olefins and ethylene. The component (A3) may be used singly or in combination of two or more.

The amount of the ethylene unit in the component (A3) relative to the total amount of the ethylene unit and the α-olefin unit is 50 wt % or more and less than 90 wt %, more preferably 50 wt % or more and 80 wt % or less. The amount of the ethylene unit in the component (A3) is preferably larger from the viewpoint of the high-temperature impact resistance of the component (A3) or preferably lower from the viewpoint of the low-temperature impact resistance. The amount of the ethylene unit in the component (A3) is more preferably 80 wt % or less.

The amount of the ethylene unit is more preferably 70 wt % or less. The amount of the structural unit derived from ethylene and the amount of the structural unit derived from at least one selected from the group consisting of propylene and α-olefins having 4 or more carbon atoms in the crystalline ethylene-based copolymer (A3) can be determined by nuclear magnetic resonance (NMR).

The ethylene-α-olefin copolymer that is the crystalline ethylene-based copolymer (A3) may have other structural unit, such as a non-conjugated diene-based structural unit (non-conjugated diene unit), in addition to the ethylene unit and the α-olefin unit having 3 to 8 carbon atoms. Examples of the non-conjugated diene include chain non-conjugated dienes, such as 1,4-hexadiene, 1,6-octadiene, 2-methyl-1,5-hexadiene, 6-methyl-1,5-heptadiene, and 7-methyl-1,6-octadiene; and cyclic non-conjugated dienes, such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene. Preferred are 5-ethylidene-2-norbornene and dicyclopentadiene.

When the crystalline ethylene-based copolymer (A3) has other structural unit, such as a non-conjugated diene unit, the amount of other structural unit relative to the total amount of the crystalline ethylene-based copolymer (A3) is normally 10 wt % or less, preferably 5 wt % or less. The amount of the non-conjugated diene unit or the propylene unit can be determined by infrared spectroscopy.

Specific examples of the crystalline ethylene-based copolymer (A3) used in this embodiment include block copolymers including a crystalline ethylene polymer block and an ethylene-α-olefin copolymer block, such as ethylene-1-butene copolymer, ethylene-1-hexene copolymer, ethylene-1-octene copolymer, ethylene-propylene-1-butene copolymer, ethylene-propylene-1-hexene copolymer, or ethylene-propylene-1-octene copolymer. These block copolymers may be used singly or in combination of two or more. Among these, the crystalline ethylene-based copolymer (A3) is most preferably a block copolymer including an ethylene polymer block and an ethylene-1-octene copolymer block, that is, the crystalline ethylene-based copolymer (A3) is most preferably an olefin-based block copolymer including an ethylene polymer block and an ethylene-1-octene copolymer block.

The crystalline ethylene-based copolymer (A3) has a crystalline ethylene polymer block and also has amorphousness from the ethylene-α-olefin copolymer block. The amorphousness is expressed by glass transition temperature, and the glass transition temperature determined by DSC is preferably −80° C. or more, more preferably −75° C. or more, and preferably −50° C. or less, more preferably −60° C. or less.

The melt flow rate (measured at a temperature of 190° C. under a load of 21.18 N) of the crystalline ethylene-based copolymer (A3) is not limited, but normally 10 g/10 min or less and, from the viewpoint of strength, preferably 8 g/10 min or less, more preferably 5 g/10 min or less, still more preferably 3 g/10 min or less. The melt flow rate of the crystalline ethylene-based copolymer (A3) is normally 0.01 g/10 min or more and, from the viewpoint of fluidity, preferably 0.05 g/10 min or more, more preferably 0.10 g/10 min or more. The melt flow rate of the component (B) is measured under the conditions of a temperature of 190° C. and a load of 21.18 N in accordance with ASTM D1238.

The density of the crystalline ethylene-based copolymer (A3) is preferably 0.880 g/cm$^3$ or less, more preferably 0.870 g/cm$^3$ or less from the viewpoint of low-temperature impact resistance. The lower limit of the density is not limited, but normally 0.850 g/cm$^3$ or more.

Examples of the method for producing the crystalline ethylene-based copolymer (A3) include synthesis according to the methods disclosed in JP-A-2007-529617, JP-A-2008-537563, and JP-A-2008-543978. For example, the crystalline ethylene-based copolymer (A3) can be produced through the process of: preparing a composition comprising a mixture or reaction product obtained by combining a first olefin polymerization catalyst, a second olefin polymerization catalyst capable of preparing a polymer different in chemical properties and physical properties from a polymer prepared by the first olefin polymerization catalyst under equivalent polymerization conditions, and a chain shuttling agent; and contacting the ethylene and the α-olefin with the composition under addition polymerization conditions.

The synthesis of the crystalline ethylene-based copolymer (A3) preferably uses continuous solution polymerization. In continuous solution polymerization, catalyst components, a chain shuttling agent, monomers, and optionally a solvent, an adjuvant, a scavenger, and a polymerization aid are continuously supplied to the reaction zone, and the polymer product is continuously removed from the reaction zone. The block length can be changed by controlling, for example, the proportion and type of catalyst, the proportion and type of chain shuttling agent, and the polymerization temperature.

Other conditions in block copolymer synthesis are disclosed in JP-A-2007-529617, JP-A-2008-537563, and JP-A-2008-543978. Examples of commercial products include Engage (registered trademark)-XLT series and INFUSE (registered trademark) series available from The Dow Chemical Company.

Propylene-Based Polymer Component (B)

The propylene-based polymer component (B) in the thermoplastic elastomer composition according to this embodiment is a (co)polymer including more than 50 wt % and 100 wt % or less of a structural unit derived from propylene. Examples of the propylene-based polymer component (B) include a propylene homopolymer, a propylene random copolymer and the following propylene polymer material. The propylene-based polymer component (B) may comprise one propylene-based polymer or may comprise two or more propylene-based polymers.

Examples of the Propylene Random Copolymer Include:
(1) a propylene-ethylene random copolymer including 90 wt % or more and 99.5 wt % or less of a structural unit derived from propylene and 0.5 wt % or more and 10 wt % or less of a structural unit derived from ethylene (provided that the total amount of the structural unit derived from propylene and the structural unit derived from ethylene is 100 wt %);
(2) a propylene-ethylene-α-olefin random copolymer including 81 wt % or more and 99 wt % or less of a structural unit derived from propylene, 0.5 wt % or more and 9.5 wt % or less of a structural unit derived from ethylene, and 0.5 wt % or more and 9.5 wt % or less of a structural unit derived from an α-olefin having 4 to 10 carbon atoms (provided that the total amount of the structural unit derived from propylene, the structural unit derived from ethylene, and the structural unit derived from an α-olefin having 4 to 10 carbon atoms is 100 wt %); and
(3) a propylene-α-olefin random copolymer including 90 wt % or more and 99.5 wt % or less of a structural unit derived from propylene and 0.5 wt % or more and 10 wt % or less of a structural unit derived from an α-olefin having 4 to 10 carbon atoms (provided that the total amount of the structural unit derived from propylene and the structural unit derived from an α-olefin having 4 to 10 carbon atoms is 100 wt %).

Examples of the α-olefin having 4 to 10 carbon atoms in the propylene-ethylene-α-olefin random copolymer and the propylene-α-olefin random copolymer include 1-butene, 1-pentene, 1-hexene, 1-heptene, 1-octene, 1-nonene, 1-decene, 3-methyl-1-butene, 3-methyl-1-pentene, 4-methyl-1-pentene, 2-ethyl-1-hexene, and 2,2,4-trimethyl-1-pentene.

Examples of the method for producing the propylene homopolymer and the propylene random copolymer include known polymerization methods using known catalysts for olefin polymerization, such as slurry polymerization, solution polymerization, bulk polymerization, and gas-phase polymerization using Ziegler-Natta catalysts or complex catalysts, such as metallocene complexes and non-metallocene complexes.

The propylene homopolymer may be produced in one polymerization reactor or may be produced by multi-step polymerization in a manufacture facility in which multiple reactors are connected in series. In manufacture of the propylene homopolymer by multi-step polymerization, the propylene homopolymer produced in the former step and the propylene homopolymer produced in the latter step may have the same or different intrinsic viscosity.

The propylene polymer material comprises a propylene homopolymer part (I) and an ethylene copolymer part (II) having a structural unit derived from at least one selected from the group consisting of propylene and α-olefins having 4 or more carbon atoms and a structural unit derived from ethylene. In the propylene polymer material, the amount of the propylene homopolymer part (I) is 70 wt % or more and 95 wt % or less, and the amount of the ethylene copolymer part (II) is 5 wt % or more and 30 wt % or less. From the viewpoint of the low-temperature impact resistance of molded articles, in the propylene polymer material, the amount of the propylene homopolymer part (I) is preferably 75 wt % or more and 95 wt % or less, and the amount of the ethylene copolymer part (II) is preferably 5 wt % or more and 25 wt % or less (provided that the total amount of the propylene polymer material is 100 wt %).

Examples of the α-olefin having 4 or more carbon atoms in the ethylene copolymer part (II) include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 3-methyl-1-butene, 3-methyl-1-pentene, 4-methyl-1-pentene, 2-ethyl-1-hexene, and 2,2,4-trimethyl-1-pentene. The α-olefin having 4 or more carbon atoms is preferably an α-olefin having 4 to 20 carbon atoms, more preferably an α-olefin having 4 to 10 carbon atoms, still more preferably 1-butene, 1-hexene, or 1-octene. These α-olefins having 4 or more carbon atoms may be used singly or in combination of two or more.

The amount of the structural unit derived from ethylene in the ethylene copolymer part (II) is normally 22 wt % or more and 80 wt % or less, preferably 25 wt % or more and 70 wt % or less, more preferably 27 wt % or more and 60 wt % or less from the viewpoint of the low-temperature impact resistance of molded articles. The amount of the structural unit derived from at least one selected from the group consisting of propylene and α-olefins having 4 or more carbon atoms in the ethylene copolymer part (II) is normally 20 wt % or more and 78 wt % or less, preferably 30 wt % or more and 75 wt % or less, more preferably 40 wt % or more and 73 wt % or less (provided that the total amount of the structural unit derived from at least one selected from the group consisting of propylene and α-olefins having 4 or more carbon atoms and the structural unit derived from ethylene is 100 wt %) from the viewpoint of the low-temperature impact resistance of molded articles. The amount of the structural unit derived from at least one selected from the group consisting of propylene and α-olefins having 4 or more carbon atoms and the amount of the structural unit derived from ethylene can be determined by infrared spectroscopy.

Examples of the ethylene copolymer part (II) include propylene-ethylene copolymer, ethylene-(1-butene) copolymer, ethylene-(1-hexene) copolymer, ethylene-(1-octene) copolymer, propylene-ethylene-(1-butene) copolymer, propylene-ethylene-(1-hexene) copolymer, and propylene-ethylene-(1-octene) copolymer. The ethylene copolymer part (II) is preferably propylene-ethylene copolymer or propylene-ethylene-(1-butene) copolymer. The ethylene copolymer part (II) may be a random copolymer or a block copolymer.

The intrinsic viscosity (hereinafter referred to as $[\eta_{exs}]$) of a 20° C.-xylene soluble portion (hereinafter referred to as a CXS portion) of the propylene polymer material is preferably 2.0 dl/g or more and 8.0 dl/g or less, more preferably 2.2 dl/g or more and 7.0 dl/g or less from the viewpoint of the low-temperature impact resistance of molded articles. The ratio of $[\eta_{exs}]$ to the intrinsic viscosity (hereinafter referred to as $[\eta_{exis}]$) of a 20° C.-xylene insoluble portion (hereinafter referred to as a CXIS portion) is preferably 2.0 or more and 12.0 or less. The intrinsic viscosity is determined in the following manner. The reduced viscosity is measured in tetralin at 135° C. using an Ubbelohde viscometer, and the intrinsic viscosity is determined from the obtained reduced viscosity by an extrapolation method in accordance with the calculation method described in "Polymer Solution, Polymer Experiment 11" (published by Kyoritsu Shuppan Co., Ltd., 1982), page 491.

The CXS portion and the CXIS portion are obtained by the following method. About 5 g of the propylene polymer material is completely dissolved in 500 ml of boiling xylene. The resulting xylene solution is gradually cooled to 20° C. and conditioned at 20° C. for 4 hours or longer. The precipitate and the solution are separated by filtration. The precipitate is the CXIS portion, and the product obtained by removing the solvent from the solution is the CXS portion.

The propylene polymer material can be produced by multi-step polymerization using a polymerization catalyst. For example, the propylene polymer material can be produced by producing the propylene homopolymer part (I) in the former polymerization step and producing the ethylene copolymer part (II) in the latter polymerization step.

Examples of the polymerization catalyst used to manufacture the propylene polymer material include Ziegler catalyst systems; Ziegler-Natta catalyst systems; a catalyst system comprising an alkylaluminoxane and a Group 4 transition metal compound having a cyclopentadienyl ring; and a catalyst system comprising a Group 4 transition metal compound having a cyclopentadienyl ring, a compound that reacts with the transition metal compound to form an ionic complex, and an organoaluminum compound.

In the presence of the above catalyst system, a prepolymerized catalyst may be used. Examples of the prepolymerized catalyst include catalyst systems disclosed in JP-A-61-218606, JP-A-61-287904, JP-A-5-194685, JP-A-7-216017, JP-A-9-316147, JP-A-10-212319, and JP-A-2004-182981.

Examples of the polymerization method for producing the propylene polymer material include bulk polymerization, solution polymerization, slurry polymerization, and gas-phase polymerization. Examples of inert hydrocarbon solvents used in solution polymerization and slurry polymerization include propane, butane, isobutane, pentane, hexane, heptane, and octane. These polymerization methods may be used in combination of two or more, and may be batch methods or continuous methods. The polymerization method for producing the propylene polymer material is preferably continuous gas phase polymerization or bulk-gas phase polymerization in which bulk polymerization and gas phase polymerization are performed continuously.

The melt flow rate of the propylene-based polymer component (B) measured at 230° C. under a load of 21.18 N in accordance with JIS K 7210 is normally 10 g/10 min or more and 300 g/10 min or less and, from the viewpoint of the tensile strength of molded articles, preferably 10 g/10 min or more and 100 g/10 min or less.

The isotactic pentad fraction of the propylene-based polymer component (B) measured by 13C-NMR is preferably 0.95 or more, more preferably 0.98 or more.

The isotactic pentad fraction refers to the fraction of propylene monomer units at the centers of isotactic chains in terms of pentad units in the molecular chain of the propylene-based polymer resin, in other words, the fraction of propylene monomer units in chains (hereinafter expressed by mmmm) of five successive meso-bonded propylene monomer units. The isotactic pentad fraction is measured by the method described in A. Zambelli et al., Macromolecules, 6, 925 (1973), that is, measured by 13C-NMR.

Specifically, the isotactic pentad fraction is the ratio of the area of an NMR peak assigned to mmmm to the area of an absorption peak in the methyl carbon region of the 13C-NMR spectrum.

The melting temperature of the propylene-based polymer component (B) is normally 100° C. or more. The melting temperature of the propylene homopolymer and the propylene polymer material, which are preferred forms of the propylene-based polymer component (B), is preferably 155° C. or more, more preferably 160° C. or more. The melting temperature of the propylene random copolymer, which is a preferred form of the propylene-based polymer component (B), is preferably 130° C. or more, more preferably 135° C. or more. The melting temperature of the propylene-based polymer component (B) is normally 175° C. or less. In the present disclosure, the melting temperature is a peak temperature of an endothermic peak having the highest peak temperature in a differential scanning calorimetry curve measured with a differential scanning calorimeter during heating operation. The conditions for measuring the differential scanning calorimetry curve with the differential scanning calorimeter are as described below.

Measurement Conditions

Cooling operation: the propylene-based polymer component (B) is melted at 220° C. and next cooled from 220° C. to −80° C. at a cooling rate of 10° C./min.

Heating operation: the propylene-based polymer component (B) is heated from −80° C. to 220° C. at 10° C./min immediately after being cooled from 220° C. to −80° C.

Propylene-Based Polymer (B2)

In this embodiment, the propylene-based polymer component (B) preferably comprises a propylene-based polymer (B2) whose 20° C.-xylene insoluble portion (hereinafter referred to as a CXIS portion) has an intrinsic viscosity $[\eta_{exis}]$ of 1.5 dl/g or more and 7.5 dl/g or less. When the propylene-based polymer (B2) is a propylene homopolymer produced by multi-step polymerization, the intrinsic viscosity $[\eta_{exis}]$ of a propylene homopolymer mixture is preferably 1.5 dl/g or more and 7.5 dl/g or less.

The method for measuring the intrinsic viscosity $[\eta_{exis}]$ of the CXIS portion of the propylene-based polymer (B2) is the same as the method for measuring the intrinsic viscosity $[\eta_{exis}]$ of the CXIS portion of the propylene polymer material described above in detail.

The intrinsic viscosity $[\eta_{exis}]$ of the CXIS portion of the propylene-based polymer (B2) is more preferably 2.0 dl/g or more and 7.0 dl/g or less, more preferably 2.5 dl/g or more and 6.0 dl/g or less. In one embodiment, the intrinsic viscosity $[\eta_{exis}]$ of the CXIS portion of the propylene-based polymer (B2) is preferably 1.5 dl/g or more and 6.0 dl/g or less.

The amount of the propylene-based polymer (B2) in the propylene-based polymer component (B) is not limited, but preferably 1 wt % or more and 50 wt % or less (provided that the total weight of the propylene-based polymer component (B) is 100 wt %), more preferably 5 wt % or more and 20 wt % or less.

A polymer that corresponds to the propylene-based polymer component (B) but does not correspond to the propylene-based polymer (B2) is also referred to as a propylene-based polymer (B1).

Other Components

The thermoplastic elastomer composition according to the present disclosure may normally comprise various additives in addition to resin components constituting the thermoplastic elastomer composition. The thermoplastic elastomer composition according to the embodiments may comprise various additives in addition to the ethylene-based polymer component (A) and the propylene-based polymer component (B).

Examples of additives include oligomers or polymers other than the components (A) and (B), softeners, such as mineral oil, inorganic fillers (e.g., talc, calcium carbonate, calcined kaolin, glass fiber, hollow glass microspheres, silica, metal soap, titanium dioxide, mica, potassium titanate fiber), organic fillers (e.g., fiber, wood flour, cellulose powder, carbon fiber, carbon black), lubricants (e.g., silicone oil, silicone gum), antioxidants (e.g., phenolic, sulfur, phosphorus, lactone, and vitamin antioxidants), weather stabilizers, UV absorbers (e.g., benzotriazole, triazine, anilide, and benzophenone UV absorbers), heat stabilizers, light stabilizers (e.g., hindered amine and benzoate light stabilizers), pigments (e.g., inorganic pigments, organic pigments, pigment dispersants), nucleating agents, foaming agents, foaming nucleating agents, plasticizers, flame retardants, brightening agents, antibiotics, light diffusing agents, adsorbents (e.g., metal oxides (e.g., zinc oxide, magnesium oxide), wetting/dispersing agents, VOC/odor stripping agents, water storage agents (e.g., an aqueous medium comprising an amphipathic polymer), scratch resistance improvers, metal chlorides (e.g., iron chloride, calcium chloride), hydrotalcite, aluminates), cross-linking agents (e.g., organic peroxides), cross-linking aids (e.g., trimethylolpropane trimethacrylate, N,N'-m-phenylenebismaleimide, and divinylbenzene, silane coupling agents). These additives may be used singly or in combination of two or more.

Examples of resins other than the component (A) and the component (B) include olefin resins (other than the component (A) and the component (B)), olefin elastomers (other than the component (A) and the component (B)), a hydrogenated product of a block copolymer including a polymer block of a monovinyl-substituted aromatic hydrocarbon compound and a polymer block of a conjugated diene compound, polyphenylene ether resins, polyamide resins, polyester resins, polyoxymethylene resins, and polymethylmethacrylate resins.

Examples of olefin resins include functionalized ethylene-based polymers, such as ethylene-vinyl acetate ("EVA"), polymers having maleic anhydride grafted to polyolefins, such as polypropylene, ethylene acrylate copolymers, such as ethylene methyl acrylate ("EMA"), and metallocene polypropylene olefin block copolymers. Metallocene polypropylene olefin block copolymers are polypropylenes in which crystalline hard "blocks" alternate with amorphous soft "blocks" that are not randomly distributed (i.e., polypropylenes with a controlled block sequence). Examples of metallocene polypropylene olefin block copolymers include, but are not limited to, INTUNE (registered trademark, available from The Dow Chemical Company).

Examples of olefin elastomers include copolymers having a structural unit derived from ethylene and a structural unit derived from at least one selected from the group consisting of propylene and α-olefins having 4 to 12 carbon atoms.

Examples of copolymers having a structural unit derived from ethylene and a structural unit derived from at least one selected from the group consisting of propylene and α-olefins having 4 to 12 carbon atoms include propylene-ethylene copolymer, ethylene-1-butene copolymer, propylene-ethylene-1-butene copolymer, ethylene-1-hexene copolymer, ethylene-1-octene copolymer, ethylene-1-hexene-1-octene copolymer, propylene-ethylene-1-hexene copolymer, propylene-ethylene-1-octene copolymer, and ethylene-1-butene-1-octene copolymer. Preferred are propylene-ethylene copolymer, ethylene-1-octene copolymer, propylene-ethylene 1-butene copolymer, propylene-ethylene-1-hexene copolymer, propylene-ethylene-1-octene copolymer, and ethylene-1-butene-1-octene copolymer. Copolymers having a structural unit derived from ethylene and a structural unit derived from at least one selected from the group consisting of propylene and α-olefins having 4 to 12 carbon atoms may be random copolymers or block copolymers. Examples of block copolymers include an olefin-based block copolymer including an ethylene polymer block and an ethylene-α-olefin copolymer block.

Examples of the softeners include mineral oils, such as paraffinic mineral oils, naphthenic mineral oils, and aromatic mineral oils. Paraffinic mineral oils are preferred. Such a softener may be added in melt-kneading the component (A) and the component (B) or may be premixed with any of the component (A) and the component (B) before the melt-kneading. Examples of the method for mixing an ethylene-based copolymer and a softener include (1) a method involving mixing a solid ethylene-based copolymer and a softener in a mixer, and (2) a method involving mixing an ethylene-based copolymer solution and a softener to form a mixture and then removing the solvent from the mixture.

The amount of the softener is preferably 0.1 wt % or more and 15 wt % or less relative to 100 wt % of the total amount of the thermoplastic elastomer composition.

In this specification, the term "mineral oil" refers to a substance in liquid form or grease form at ordinary temperature, which is produced from a hydrocarbon compound derived from petroleum and is composed of at least one compound selected from the group consisting of aromatic compounds, naphthenic ring compounds, and paraffinic compounds.

The hydrogenated product of a block copolymer including a polymer block of a monovinyl-substituted aromatic hydrocarbon compound and a polymer block of a conjugated diene compound is a hydrogenated product obtained by hydrogenating the Y part of a block copolymer represented by the following formula (1) or (2).

$$X\text{—}Y \quad \text{Formula (1)}$$

$$X(\text{—}Y\text{—}X)n \quad \text{Formula (2)}$$

wherein X represents a polymer block of a monovinyl-substituted aromatic hydrocarbon, Y represents a conjugated diene polymer block, and n represents an integer of 1 to 5, preferably 1 or 2. The amount of the monovinyl-substituted aromatic hydrocarbon compound is preferably 0.1 wt % or more and 60 wt % or less relative to 100 wt % of the total amount of the thermoplastic elastomer composition. The amount of the monovinyl-substituted aromatic hydrocarbon compound is more preferably 5 wt % or more and 40 wt % or less, still more preferably 5 wt % or more and 20 wt % or less.

Examples of the monovinyl-substituted aromatic hydrocarbon that constitutes the polymer block represented by X in the formula (1) or (2) include styrene and its derivatives, such as styrene, α-methylstyrene, p-methylstyrene, chlorostyrene, lower alkyl-substituted styrene, and vinylnaphthalene. These monovinyl-substituted aromatic hydrocarbons may be used singly or in combination of at least two. Preferred is styrene.

Examples of the conjugated diene that constitutes the polymer block represented by Y in the formula (1) or (2) include butadiene, isoprene, and chloroprene. These conjugated dienes may be used singly or in combination of at least two. Preferred is butadiene or isoprene.

When butadiene is used as a conjugated diene, the proportion of 1,2-bonds in the polybutadiene block is normally 20 to 80 wt %, preferably 30 to 60 wt %.

In the hydrogenated product of the block copolymer represented by the formula (1) or (2), the percentage hydrogenation of the conjugated diene polymer block (Y part) is normally 90 mol % or more, preferably 95 mol % or more (provided that the total amount of the Y part is 100 mol %). The amount of the X part is normally 1 to 30 wt %, preferably 10 to 25 wt % (provided that the total amount of the hydrogenated product of the block copolymer represented by the formula (1) or (2) is 100 wt %).

The melt flow rate (MFR, ASTM D-1238, 230° C., 2.16 kg load) of the hydrogenated product of the block copolymer represented by the formula (1) or (2) is normally preferably 30 g/10 min or less, more preferably 1 to 10 g/10 min.

Examples of the hydrogenated product of the block copolymer represented by the formula (1) or (2) include styrene-based block copolymers obtained by hydrogenation.

Examples include styrene-ethylene-butene-styrene block copolymer (SEBS) obtained by hydrogenation of styrene-butadiene-styrene triblock copolymer, styrene-ethylene-propylene-styrene block copolymer (SEPS) obtained by hydrogenation of styrene-isoprene-styrene triblock copolymer, and styrene-ethylene-propylene block copolymer (SEP) obtained by hydrogenation of styrene-isoprene diblock copolymer.

Examples of the method for producing a block copolymer before hydrogenation may include block copolymerization of monomers in an inert solvent in the presence of a lithium catalyst or Ziegler catalyst. The details of the producing method are described in, for example, JP-B-40-23798.

Examples of the method for hydrogenating the block copolymer represented by the formula (1) or (2) include hydrogenation of the block copolymer in an inert solvent in the presence of a known hydrogenation catalyst. The details of the method are described in, for example, JP-B-42-8704, JP-B-43-6636, and JP-B-46-20814.

The hydrogenated product of the block copolymer represented by the formula (1) or (2) may be a commercial product, such as KRATON G1657 (registered trademark, available from Kraton Polymers Japan Ltd.), SEPTON 2004 (registered trademark, available from Kuraray Co., Ltd.), or Tuftec H1052 or Tuftec H1062 (registered trademark, available from Asahi Kasei Corporation).

Produce of Thermoplastic Elastomer Composition

The thermoplastic elastomer composition can be produced by melt-kneading material resins, such as the ethylene-based polymer component (A) and the propylene-based polymer component (B), and optionally various additives by an ordinary method using, for example, a common extruder, a Bunbury mixer, a roll, a Brabender Plastograph, or a kneader Brabender. The thermoplastic elastomer composition is preferably produced by using an extruder, particularly a twin screw extruder.

The thermoplastic elastomer composition according to the present disclosure may be produced through cross-linking or non-cross-linking, preferably through cross-linking from the viewpoint of, for example, fluidity or moldability into a thin shape or the like.

Cross-linking preferably involves introducing material resins and various cross-linking agents and cross-linking aids into an extruder, particularly a twin screw extruder, and dynamically heating the mixture to cause cross-linking.

When the thermoplastic elastomer composition comprises the component (B2) in the case of cross-linking, the thermoplastic elastomer composition is preferably produced by a method including a step of cross-linking the ethylene-based polymer component (A) and the propylene-based polymer component (B) in a presence of a cross-linking agent through dynamic heating to generate a thermoplastic elastomer precursor and a step of kneading the thermoplastic elastomer precursor and the component (B2) to generate a thermoplastic elastomer composition.

The thermoplastic elastomer composition according to the present disclosure is used in various applications and preferably used in applications requiring impact resistance, particularly both low-temperature impact resistance and high-temperature impact resistance. Examples of applications include, but are not limited to, automotive parts, industrial machinery parts, electronic and electrical device parts, and building materials.

The thermoplastic elastomer composition is particularly preferably used for automotive interior parts to be used in a wide range of temperatures, particularly airbag covers requiring strict control of impact resistance.

In this embodiment, the thermoplastic elastomer composition according to the present disclosure can be molded into an airbag cover by using, for example, an ordinary injection molding method or, as desired, various molding methods, such as gas injection molding, injection compression molding, and short-shot foam molding. Regarding the molding conditions in the injection molding, the molding temperature is normally 100° C. to 300° C., preferably 150° C. to 280° C., the injection pressure is 5 to 100 MPa, preferably 10 to 80 MPa, and the mold temperature is 20° C. to 80° C., preferably 20° C. to 60° C.

EXAMPLES

The present disclosure is described below in more detail with reference to Examples and Comparative Examples. The technical scope of the present disclosure is not limited by the Examples in any way.

The physical properties were evaluated by the following methods in Examples and Comparative Examples.

Measurement of Physical Properties

1. Melt Flow Rate (MFR)

The melt flow rate was measured under the conditions of 230° C. and a load of 21.18 N in accordance with the B method in JIS K 7210.

2. Enthalpies of Fusion $\Delta H_{m1}$ and $\Delta H_{m2}$

The enthalpy of fusion $\Delta H_{m1}$ in a temperature range of 70° C. or more and 200° C. or less and the enthalpy of fusion $\Delta H_{m2}$ in a temperature range of 70° C. or more and 140° C. or less were determined as a heat of fusion by analyzing, in accordance with the method specified in JIS K 7122-1987, part of a melting curve in a temperature range of 70° C. or more and 200° C. or less and in a temperature range of 70° C. or more and 140° C. or less as measured by differential scanning calorimetry described below.

The crystal melting peak temperature in a temperature range of 70° C. or more and 200° C. or less and in a temperature range of 70° C. or more and 140° C. or less was determined as a temperature at the top of a melting peak obtained by analyzing, in accordance with the method specified in JIS K 7121-1987, the melting curve in a temperature range of 70° C. or more and 200° C. or less and in a temperature range of 70° C. or more and 140° C. or less as measured by differential scanning calorimetry described below.

The glass transition temperature is a midpoint glass transition temperature determined by analyzing, in accordance with the method specified in JIS K 7121-1987, the melting curve measured by differential scanning calorimetry described below.

The peak temperature of an endothermic peak having the highest peak temperature in a differential scanning calorimetry curve measured with a differential scanning calorimeter during the heating operation is defined as a melting temperature.

Measurement Conditions

A sample is melted at 220° C. and next cooled from 220° C. to −80° C. at a cooling rate of 10° C./min.

Heating operation: the propylene-based polymer component (B) is heated from −80° C. to 220° C. at 10° C./min immediately after being cooled from 220° C. to −80° C.

3. Intrinsic Viscosity ($[\eta_{exs}]$, $[\eta_{exis}]$, unit: dl/g)

About 5 g of the sample was completely dissolved in 500 ml of boiling xylene. The resulting xylene solution was gradually cooled to 20° C. and conditioned at 20° C. for 4 hours or longer. The precipitate and the solution were then separated by filtration. The precipitate was a CXIS portion, and the product obtained by removing the solvent from the solution was a CXS portion.

The reduced viscosity was measured in tetralin at 135° C. using an Ubbelohde viscometer, and the intrinsic viscosity was determined from the obtained reduced viscosity by an extrapolation method in accordance with the calculation method described in "Polymer Solution, Polymer Experiment 11" (published by Kyoritsu Shuppan Co., Ltd., 1982), page 491.

4. Isotactic Pentad Fraction

The isotactic pentad fraction was determined by carrying out nuclear magnetic resonance (NMR) under the following conditions (1) to (7) and calculating the ratio of the area of an NMR peak assigned to mmmm to the area of an NMR peak in the methyl carbon region in accordance with the method described in the literature (Macromolecules, 6, 925 (1973)).

(1) System: Avance III HD600 available from Bruker Corporation
(10 mm CryoProbe)
(2) Measurement solvent: 1,2-dichlorobenzene-d4/1,2-dichlorobenzene
(20/80 volume ratio)
(3) Measurement temperature: 130° C.
(4) Measurement method: proton decoupling method
(5) Pulse width: 45 degrees
(6) Pulse repetition time: 4 seconds
(7) Reference of chemical shift: tetramethylsilane 5. Amount of Structural Unit Derived from Ethylene and Amount of Structural Unit Derived from at Least One Selected from Group Consisting of Propylene and α-Olefins Having 4 or More Carbon Atoms in Non-Conjugated Diene Copolymer in Component (A)

The non-conjugated diene copolymer was formed into a film with a thickness of about 0.1 mm by using a hot-press machine, and the infrared absorption spectrum of the film was measured by using an infrared spectrophotometer (IR-810 available from JASCO Corporation). From the infrared absorption spectrum, the amount of the structural unit derived from ethylene and the amount of the structural unit derived from at least one selected from the group consisting of propylene and α-olefins having 4 or more carbon atoms in the non-conjugated diene copolymer were determined in accordance with the method described in the literature "Characterization of Polyethylene from Infrared Absorption Spectrum, Takayama, Usami, et al." or "Die Makromolekulare Chemie, 177, 461 (1976), Mc Rae, M. A., Madam S, W. F. et al."

6. Iodine Value of Non-Conjugated Diene Copolymer in Component (A)

The non-conjugated diene copolymer was formed into a film with a thickness of about 0.5 mm by using a hot-press machine. The intensities of the peak (absorption peak at 1611 cm$^{-1}$) from dicyclopentadiene and the peak (absorption peak at 1688 cm$^{-1}$) from 5-ethylidene-2-norbornene in the film were measured by using an infrared spectrophotometer. The molar content of double bonds was determined from the peak intensities, and the iodine value was calculated from the molar content.

7. Molecular Weight Distribution

The molecular weight distribution (Mw/Mn) was calculated by measuring the weight-average molecular weight (Mw) and the number-average molecular weight (Mn) by gel permeation chromatography (GPC) under the following conditions (1) to (9).

(1) Apparatus: HLC-8121 GPC/HT available from Tosoh Corporation
(2) Separation column: three columns GMHHR-H(S)HT available from Tosoh Corporation
(3) Measurement temperature: 140° C.
(4) Carrier: ortho-dichlorobenzene
(5) Flow rate: 1.0 mL/min
(6) Sample concentration: about 1 mg/mL
(7) Sample injection volume: 400 µL
(8) Detector: differential refractometer
(9) Molecular weight standard substance: standard polystyrene 8. Mooney Viscosity The Mooney viscosity was measured at 125° C. in accordance with ASTM D-1646.

9. Density (unit: g/cm$^3$)

The density was measured without annealing in accordance with JIS K 7112.

10. Amount of Structural Unit Derived from Ethylene in Ethylene Copolymer of Component (A), Component (B), and Component (C) (unit: wt %)

The amount of the structural unit derived from ethylene in the ethylene copolymer was determined by carrying out nuclear magnetic resonance (NMR) under the following conditions (1) to (7) in accordance with the method described in the literature (JMS-REV. MACROMOL. CHEM. PHYS., C29, 201-317 (1989)) (provided that the total amount of the ethylene copolymer was 100 wt %).

(1) System: Avance III HD600 available from Bruker Corporation
(10 mm CryoProbe)
(2) Measurement solvent: 1,1,2,2-tetrachloroethane-d2/1,2-dichlorobenzene (15/85 volume ratio)
(3) Measurement temperature: 135° C.
(4) Measurement method: proton decoupling method
(5) Pulse width: 45 degrees
(6) Pulse repetition time: 4 seconds
(7) Reference of chemical shift: tetramethylsilane 11. Method for Producing Injection-Molded Article Injection-molded articles, 90 mm long, 150 mm wide, and 2.0 mm thick, were produced by injection-molding the thermoplastic elastomer compositions according to Examples and Comparative Examples using a side gate plate mold in an injection molding machine EC 160NII available from Toshiba Corporation under the conditions of a cylinder temperature of 220° C., a mold temperature of 50° C., and an injection rate of 25 cm$^3$/sec.

12. Method for Preparing Specimen

Specimens having a size of 30 mm (wide)×30 mm (long)× 2.0 mm (thick) were punched out from central portions of the molded articles produced above in section 11 by using a dumbbell cutter (30×30 mm) available from Dumbbell Co., Ltd.

13. Low-Temperature Impact Resistance (IZOD Impact Strength)

The impact resistance of the injection-molded articles produced above in section 11 was measured in accordance with JIS K 7110. The measurement was carried out at −40° C.

The measurement results were evaluated as described below.

P (partial break): an incomplete break that does not meet the definition of hinge break H (hinge break): an incomplete break such that both specimen parts are held together by only a thin surface layer in the form of a hinge having no bending stiffness C (complete break): a specimen breaks in two or more pieces 14. High-Temperature Impact Resistance (IZOD Impact Strength)

The impact resistance of the injection-molded articles produced above in section 11 was measured in accordance with JIS K 7110. The measurement was carried out at 85° C.

15. Solvent Swellability

In accordance with JIS K 6258, the width, length, and thickness of the specimens prepared above in section 12 were measured after the specimens were impregnate with petroleum benzine (available from FUJIFILM Wako Pure Chemical Corporation) at 23° C. for 24 hours. The area increase rate and the volume increase rate were calculated according to the following formula.

Area increase rate $S$: $(S_{24}/S_0-1)\times100[\%]$

Volume increase rate $V$: $(V_{24}/V_0-1)\times100[\%]$ $S_0$: area(width×length) before impregnation with petroleum benzine, $S_{24}$: area(width×length) after impregnation with petroleum benzine, $V_0$: volume(width×length×thickness) before impregnation with petroleum benzine, $V_{24}$: volume(width×length×thickness) after impregnation with petroleum benzine Materials The details of starting materials used in Examples and Comparative Examples are as described below.

Ethylene-Based Polymer Component (A)

(A1-1-i) Ethylene-1-Octene Copolymer

Engage 8842 available from The Dow Chemical Company

The enthalpy of fusion in a temperature range of 70° C. or more and 140° C. or less as measured by differential scanning calorimetry=0 J/g, the amount of structural unit derived from ethylene=55 wt %, the amount of structural unit derived from 1-octene=45 wt %, the Mooney viscosity (ML$_{1+4}$, 125° C.)=23, the density=0.857 g/cm$^3$ (A1-2-i) Ethylene-Propylene-5-Ethylidene-2-Norbornene Copolymer Preparation Method To a first polymerization tank made of stainless steel and equipped with a stirrer, hexane, ethylene, and propylene were supplied at rates of 408 g/(hr·L), 25.4 g/(hr·L), and 117.7 g/(hr·L) per unit time-unit polymerization tank volume, respectively. After being mixed and stirred in a line mixer, VOCl$_3$ and ethanol were supplied to the polymerization tank at rates of 26.5 mg/(hr·L) and 12.7 mg/(hr·L) (VOCl$_3$/ethanol=1/1.8 (molar ratio)), respectively. Ethylaluminum sesquichloride (EASC) and hydrogen were supplied to the polymerization tank at rates of 158.7 mg/(hr·L) and 0.05 NL/(hr·L), respectively. Moreover, 5-ethylidene-2-norbornene was supplied to the polymerization tank at a rate of 0.5 g/(hr·L). The polymerization tank was maintained at a temperature of 41° C. In the polymerization tank, 38 g/(hr·L) of a non-conjugated diene copolymer was produced per unit time·unit polymerization tank volume. Next, a polymerization solution taken from the first polymerization tank was fed to a second polymerization tank made of stainless steel, equipped with a stirrer, and having the same volume as the first polymerization tank. Hexane, ethylene, and propylene were supplied at rates of 204 g/(hr·L), 15.2 g/(hr·L), and 100.4 g/(hr·L) per unit time·unit polymerization tank volume, respectively. After being mixed and stirred in a line mixer, $VOCl_3$ and ethanol were supplied to the polymerization tank at rates of 16.7 mg/(hr·L) and 8.0 mg/(hr·L) (VOCla/ethanol=1/1.8 (molar ratio)), respectively. Ethylaluminum sesquichloride (EASC) was supplied to the polymerization tank at a rate of 66.8 mg/(hr·L). The polymerization tank was maintained at a temperature of 45° C. In the second polymerization tank, 19 g/(hr·L) of a non-conjugated diene copolymer was produced per unit time·unit polymerization tank volume.

With regard to the non-conjugated diene copolymer produced by the above preparation method, the Mooney viscosity ($ML_{1+4}$, 125° C.), the amount of the structural unit derived from ethylene, the amount of the structural unit derived from propylene, the iodine value and the molecular weight distribution are as described below.

The Mooney viscosity ($ML_{1+4}$, 125° C.)=65, MFR (190° C., 21.18 N)=0.5 g/10 min, the amount of structural unit derived from ethylene=55 wt %, the amount of structural unit derived from propylene=45 wt %, the iodine value=2.1, the molecular weight distribution=1.9, the enthalpy of fusion in a temperature range of 70° C. or more and 140° C. or less as measured by differential scanning calorimetry=0 J/g (A2-1-i) High-Density Polyethylene (HDPE)

Product name "M6901" available from Keiyo Polyethylene Co., Ltd.

The crystal melting peak temperature=132° C., the enthalpy of fusion in a temperature range of 70° C. or more and 140° C. or less as measured by differential scanning calorimetry=236 J/g MFR (190° C., 21.18 N)=13 g/10 min, the density=0.962 g/cm$^3$, the amount of structural unit derived from ethylene=100 wt %, (A2-2-i) Low-Density Polyethylene (LDPE)

Product name "G801" available from Sumitomo Chemical Co., Ltd., the crystal melting peak temperature=104° C., the enthalpy of fusion in a temperature range of 70° C. or more and 140° C. or less as measured by differential scanning calorimetry=128 J/g, MFR (190° C., 21.18 N)=20 g/10 min, the density=0.919 g/cm, the amount of structural unit derived from ethylene=100 wt %

(A3-i) Olefin Block Copolymer (OBC)

Product name "Engage XLT8677" available from The Dow Chemical Company

The crystal melting peak temperature=118° C., the enthalpy of fusion in a temperature range of 70° C. or more and 140° C. or less as measured by differential scanning calorimetry=42 J/g, MFR (190° C., 21.18 N)=0.5 g/10 min, the glass transition temperature (DSC method)=−67° C., the density=0.870 g/cm$^3$, the amount of the structural unit derived from ethylene=52 wt %

(A3-ii) Olefin Block Copolymer (OBC)

Product name "INFUSE D9007" available from The Dow Chemical Company

The crystal melting peak temperature=119° C., the enthalpy of fusion in a temperature range of 70° C. or more and 140° C. or less as measured by differential scanning calorimetry=37 J/g, MFR (190° C., 21.18 N)=0.5 g/10 min, the glass transition temperature (DSC method)=−63° C., the density=0.870 g/cm$^3$, the amount of the structural unit derived from ethylene=56 wt %

Propylene-Based Polymer Component (B)

(B1-1-i) Propylene Homopolymer (h-PP)

MFR (230° C.)=40 g/10 min, $[\eta_{exis}]$=1.25 dl/g (B1-2-i) Propylene Polymer Material Comprising Propylene Homopolymer Part (I) and Ethylene Copolymer Part (II)

Product name "NOBLEN AZ565" available from Sumitomo Chemical Co., Ltd.

MFR (230° C.)=32 g/10 min, the melting temperature=165° C., $[\eta_{exis}]$=1.0 dl/g, $[\eta_{exs}]$=5.0 dl/g, the isotactic pentad fraction=0.98, the amount of ethylene copolymer part (II)=16 wt %, the amount of structural unit derived from ethylene in the ethylene copolymer part (II)=35 wt %

(B2-i) Propylene Homopolymer (h-PP)

MFR (230° C.)=0.5 g/10 min, $[\eta_{exis}]$=3.0 dl/g (B2-ii) Propylene Homopolymer (h-PP)

B2-ii is a propylene homopolymer produced by multi-step polymerization. B2-ii is a mixture of a propylene homopolymer component b1 produced in the former step and a propylene homopolymer component b2 produced in the latter step. The amount of the propylene homopolymer component b1 in the former step is 18 wt %, and the amount of the propylene homopolymer component b2 in the latter step is 82 wt %.

MFR (230° C.) of B2-ii=11 g/10 min, the melting temperature of B2-ii=165° C., $[\eta_{exis}]$ total of B2-ii=2.0 dl/g, $[\eta_{exis}]$ of b1=7.0 dl/g, $[\eta_{exis}]$ of b2=0.92 dl/g (C1-i) Styrene-Ethylene-Butene-Styrene Block Copolymer (SEBS)

Product name "Tuftec H1062" available from Asahi Kasei Corporation

MFR (230° C.)=17 g/10 min, the styrene content=18 wt %

Other Components

Antioxidant: product name "Sumilizer GA80" available from Sumitomo Chemical Co., Ltd.

Antioxidant: product name "Irgafos 168" available from BASF Japan Ltd.

Example 1

A thermoplastic elastomer composition was produced by melt-kneading, with a twin screw extruder at a cylinder temperature of 200° C., 40.0 parts by weight of ethylene-based polymer (A1-1-i), 10.0 parts by weight of ethylene-based polymer (A2-1-i), 40.0 parts by weight of propylene-based polymer (B1-1-i), 10.0 parts by weight of propylene-based polymer (B2-i) (provided that the total amount of components (A) (components starting with reference character "A", (A1-1-i) and (A2-1-i) in this Example) and components (B) (components starting with reference character "B", (B1-1-i) and (B2-i) in this Example) is 100 parts by weight), 0.10 parts by weight of antioxidant (Sumilizer GA80), and 0.10 parts by weight of antioxidant (Irgafos 168).

The produced thermoplastic elastomer composition was injection-molded into a molded article by the method described in section 11. The measurement results of the physical properties of the molded article are shown in Table 1.

Examples 2 to 14, Comparative Examples 1 to 4 and 6 to 10

Thermoplastic elastomer compositions were produced in the same manner as in Example 1 except that components and the amounts of components are as shown in Table 1 or Table 2. The produced thermoplastic elastomer composition was injection-molded into a molded article by the method described in section 11. The measurement results of the physical properties of the molded articles are shown in Table 1 or Table 2.

Comparative Example 5

A thermoplastic elastomer composition was produced in the same manner as in Example 1 except that components and the amounts of components are as shown in Table 2. The produced thermoplastic elastomer composition was subjected to injection molding in accordance with the method described in section 11. The entire mold was not filled with the molten resin, so that only an injection-molded article having a size smaller than the mold size was produced. A specimen was punched out from a central portion of the injection-molded article in accordance with the method described in section 12, and the physical properties of the specimen were measured. The results are shown in Table 2.

[Table 1]

TABLE 2

| | | | | Example 1 | Example 2 | Example 3 | Example 4 | Example 5 | Example 6 | Example 7 |
|---|---|---|---|---|---|---|---|---|---|---|
| Component (A) | (A1-1-i) | parts by weight | | 40.0 | 45.0 | 45.0 | | | | |
| | (A1-2-i) | parts by weight | | | | | | | | |
| | (A2-1-i) | parts by weight | | 10.0 | 10.0 | 10.0 | | | | 5.0 |
| | (A2-2-i) | parts by weight | | | | | | | | |
| | (A3-i) | parts by weight | | | | | 50.0 | 55.0 | | 50.0 |
| | (A3-ii) | parts by weight | | | | | | | 55.0 | |
| Component (B) | (B1-1-i) | parts by weight | | 40.0 | 40.0 | 35.0 | 45.0 | 40.0 | 40.0 | 40.0 |
| | (B1-2-i) | parts by weight | | | | | | | | |
| | (B2-i) | parts by weight | | 10.0 | 5.0 | 10.0 | 5.0 | 5.0 | 5.0 | 5.0 |
| | (B2-ii) | parts by weight | | | | | | | | |
| Component (C) | (C1-i) | parts by weight | | | | | | | | |
| Additive | Sumilizer G80 | parts by weight | | 0.10 | 0.10 | 0.10 | 0.10 | 0.10 | 0.10 | 0.10 |
| | Irgafos 168 | parts by weight | | 0.10 | 0.10 | 0.10 | 0.10 | 0.10 | 0.10 | 0.10 |
| Solvent swellability (petroleum benzine) | Area Increase Rate S | % | | 6 | 7 | 6 | 13 | 14 | 11 | 13 |
| | Volume increase rate V | % | | 85 | 108 | 113 | 58 | 79 | 81 | 70 |
| Enthalpy of fusion (DSC) | $\Delta H_{mA}$ | J/g | | 47 | 43 | 43 | 42 | 42 | 37 | 60 |
| | $\Delta H_{m1}$ | J/g | | 80 | 75 | 74 | 74 | 71 | 66 | 81 |
| | $\Delta H_{m2}$ | J/g | | 15 | 17 | 16 | 13 | 15 | 12 | 24 |
| IZOD impact test | −40° C. | kJ/m² | | 22.0 | 71.0 | 85.0 | 96.4 | 103.3 | 103.0 | 99.7 |
| | Type of break | — | | H | P | P | P | P | P | P |
| | 85° C. | kJ/m² | | 46.6 | 40.9 | 40.1 | 42.7 | 40.3 | 41.6 | 41.2 |
| | Type of break | — | | P | P | P | P | P | P | P |

| | | | | Example 8 | Example 9 | Example 10 | Example 11 | Example 12 | Example 13 | Example 14 |
|---|---|---|---|---|---|---|---|---|---|---|
| Component (A) | (A1-1-i) | parts by weight | | | | | | | | |
| | (A1-2-i) | parts by weight | | 30.0 | 45.0 | 45.0 | 45.0 | 45.0 | | 35.0 |
| | (A2-1-i) | parts by weight | | 5.0 | 5.0 | 5.0 | 5.0 | 5.0 | | |
| | (A2-2-i) | parts by weight | | | | | | | | 15.0 |
| | (A3-i) | parts by weight | | | | | | | 45.0 | |

TABLE 2-continued

| | | | | | | | | | |
|---|---|---|---|---|---|---|---|---|---|
| | (A3-ii) | parts by weight | | | | | | | |
| Component (B) | (B1-1-i) | parts by weight | | 35.0 | | 45.0 | 40.0 | | |
| | (B1-2-i) | parts by weight | 55.0 | | 40.0 | | | 40.0 | 40.0 |
| | (B2-i) | parts by weight | 5.0 | 15.0 | 10.0 | | | 10.0 | 10.0 |
| | (B2-ii) | parts by weight | | | | 5.0 | 10.0 | | |
| Component (C) | (C1-i) | parts by weight | 5.0 | | | | | 5.0 | |
| Additive | Sumilizer G80 | parts by weight | 0.10 | 0.10 | 0.10 | 0.10 | 0.10 | 0.10 | 0.10 |
| | Irgafos 168 | parts by weight | 0.10 | 0.10 | 0.10 | 0.10 | 0.10 | 0.10 | 0.10 |
| Solvent swellability (petroleum benzine) | Area Increase Rate S | % | 14 | 9 | 11 | 13 | 11 | 14 | 11 |
| | Volume increase rate V | % | 81 | 109 | 114 | 103 | 109 | 79 | 77 |
| Enthalpy of fusion (DSC) | $\Delta H_{mA}$ | J/g | 34 | 24 | 24 | 24 | 24 | 42 | 38 |
| | $\Delta H_{m1}$ | J/g | 71 | 72 | 71 | 75 | 76 | 67 | 66 |
| | $\Delta H_{m2}$ | J/g | 7 | 7 | 8 | 8 | 8 | 11 | 7 |
| IZOD impact test | −40° C. | kJ/m² | 108.9 | 109.2 | 114.6 | 102.1 | 100.9 | 114.3 | 107.8 |
| | Type of break | — | P | P | P | P | P | P | P |
| | 85° C. | kJ/m² | 47.8 | 46.6 | 42.2 | 43.9 | 42.6 | 43.0 | 41.6 |
| | Type of break | | P | P | P | P | P | P | P |

The thermoplastic elastomer composition according to the present disclosure can provide a molded article having both high low-temperature impact resistance and high high-temperature impact resistance. The thermoplastic elastomer composition is thus suitably used to manufacture molded articles used in a wide temperature range, such as airbag covers and has high industrial applicability in various fields, such as automobile and other transport machinery industries, sports and leisure goods industry, household goods industry, electrical and electronic equipment industry, and construction industry.

What is claimed is:

1. A thermoplastic elastomer composition, wherein a specimen having a size of 30 mm wide×30 mm long×2.0 mm thick punched out from a central portion of a molded article formed by injection-molding the thermoplastic elastomer composition into a mold cavity, 90 mm wide×150 mm long×2.0 mm thick, under conditions of a cylinder temperature of 220° C., a mold temperature of 50° C., and an injection rate of 25 cm³/sec satisfies the following requirements (1) and (2), Requirement (1): an area increase rate S of the specimen after impregnation with petroleum benzine at 23° C. for 24 hours is 20% or less; and Requirement (2): a volume increase rate V of the specimen after impregnation with petroleum benzine at 23° C. for 24 hours is 20% or more and 125% or less.

2. The thermoplastic elastomer composition according to claim 1, wherein the thermoplastic elastomer composition comprises an ethylene-based polymer component (A) and a propylene-based polymer component (B).

3. The thermoplastic elastomer composition according to claim 2, wherein the ethylene-based polymer component (A) comprises at least one ethylene-based polymer selected from the group consisting of the following component (A1), the following component (A2) and the following component (A3), and the ethylene-based polymer component (A) has an enthalpy of fusion $\Delta H_{mA}$ of 1 J/g or more and 115 J/g or less in a temperature range of 70° C. or more and 140° C. or less as measured by differential scanning calorimetry, Component (A1): an amorphous ethylene-based polymer;

Component (A2): a crystalline ethylene-based polymer comprising 90 wt % or more of a structural unit derived from ethylene; and Component (A3): a crystalline ethylene-based copolymer comprising 50 wt % or more and less than 90 wt % of a structural unit derived from ethylene.

4. The thermoplastic elastomer composition according to claim 1, wherein the thermoplastic elastomer composition has an enthalpy of fusion $\Delta H_{m1}$ of 115 J/g or less in a temperature range of 70° C. or more and 200° C. or less as measured by differential scanning calorimetry.

5. The thermoplastic elastomer composition according to claim 1, wherein the thermoplastic elastomer composition has an enthalpy of fusion $\Delta H_{m2}$ of 1 J/g or more in a temperature range of 70° C. or more and 140° C. or less as measured by differential scanning calorimetry.

6. The thermoplastic elastomer composition according to claim 2, wherein the component (B) comprises a propylene-based polymer (B2) whose insoluble portion has an intrinsic viscosity ($[\eta_{cxis}]$) of 1.5 dl/g or more and 7.5 dl/g or less.

7. The thermoplastic elastomer composition according to claim 6, wherein the insoluble portion of the propylene-based polymer (B2) has an intrinsic viscosity ($[\eta_{cxis}]$) of 1.5 dl/g or more and 6.0 dl/g or less.

8. The thermoplastic elastomer composition according to claim 1, wherein the thermoplastic elastomer composition satisfies the following requirement (1'), Requirement (1'): the area increase rate S of the specimen after impregnation with petroleum benzine at 23° C. for 24 hours is 4% or more and 15% or less.

9. The thermoplastic elastomer composition according to claim 1, wherein the thermoplastic elastomer composition satisfies the following requirement (2'), Requirement (2'): the volume increase rate V of the specimen after impregnation with petroleum benzine at 23° C. for 24 hours is 55% or more and 115% or less.

10. A molded article comprising the thermoplastic elastomer composition according to claim 1.

11. An airbag cover comprising the thermoplastic elastomer composition according to claim 1.

* * * * *